US007317983B2

(12) United States Patent
Ishizuka et al.

(10) Patent No.: US 7,317,983 B2
(45) Date of Patent: Jan. 8, 2008

(54) FUEL INJECTION CONTROLLING APPARATUS FOR INTERNAL COMBUSTION ENGINE

(75) Inventors: Koji Ishizuka, Chita-gun (JP); Kenichiro Nakata, Kariya (JP); Jun Kawamura, Chita-gun (JP)

(73) Assignee: Denso Corporation, Kariya, Aichi-pref. (JP)

( * ) Notice: Subject to any disclaimer, the term of this patent is extended or adjusted under 35 U.S.C. 154(b) by 18 days.

(21) Appl. No.: 11/455,702

(22) Filed: Jun. 20, 2006

(65) Prior Publication Data

US 2006/0293828 A1 Dec. 28, 2006

(30) Foreign Application Priority Data

Jun. 22, 2005 (JP) ............................ 2005-182117
Jul. 29, 2005 (JP) ............................ 2005-221476
May 12, 2006 (JP) ............................ 2006-133801

(51) Int. Cl.
*F02D 41/14* (2006.01)
*G06F 19/00* (2006.01)
*F02D 45/00* (2006.01)

(52) U.S. Cl. ...................... 701/103; 701/110; 123/350

(58) Field of Classification Search ................ 701/103, 701/105, 110, 111, 114, 102; 123/350, 352, 123/357, 478, 480
See application file for complete search history.

(56) References Cited

U.S. PATENT DOCUMENTS 4,715,339 A * 12/1987 Sagawa et al. ............. 123/357
6,678,605 B2 * 1/2004 Kisaka et al. ............... 701/111

FOREIGN PATENT DOCUMENTS

DE 195 27 218 6/1996
JP 6-50077 3/1986
JP 8-218924 8/1996

OTHER PUBLICATIONS

Korean Examination Report issued Jul. 26, 2007 in Application No. 10-2006-0055897 with English translation.
Korean Office Action issued Mar. 28, 2007, and an English translation, issued in corresponding Korean Application No. 10-2006-0055897.

* cited by examiner

*Primary Examiner*—Hieu T. Vo
(74) *Attorney, Agent, or Firm*—Nixon & Vanderhye P.C.

(57) ABSTRACT

A sensor signal from a speed sensor is inputted into an ECU. The ECU calculates a rotation speed of a crankshaft in a predetermined period based on the sensor signal. The rotation speed is filtered by a frequency which is defined based on a combustion frequency of the engine to obtain a value corresponding to a current torque. The ECU calculates a workload of each cylinder based on the value corresponding to the current torque, and controls characteristic of each cylinder based on the workload.

23 Claims, 11 Drawing Sheets

FUEL INJECTION CONTROLLING APPARATUS FOR INTERNAL COMBUSTION ENGINE

CROSS REFERENCE TO RELATED APPLICATIONS

This application is based on Japanese Patent Applications No. 2005-182117 filed on Jun. 22, 2005, No. 2005-221476 filed on Jul. 29, 2005, and No. 2006-133801 filed on May 12, 2006, the disclosure of which are incorporated herein by reference.

FIELD OF THE INVENTION

The present invention relates to a fuel injection controlling apparatus for an internal combustion engine. Especially, the apparatus performs a control in which dispersion in rotation speed of crankshaft between cylinders is restricted.

BACKGROUND OF THE INVENTION

An individual difference of injector or a dispersion of valve timing of an intake/exhaust valve may cause the dispersion in rotation speed of each cylinder. JP-6-50077B shows the fuel injection amount is corrected in order to average the rotation speed of each cylinder by detecting the variation in rotation speed (a rotation angle speed). However, this correction of the fuel injection amount is conducted only while the engine is stable, such as at idle. That is, while the engine is running at various speed, the dispersion in rotation speed between cylinders can not be corrected, so that the emission may increases and the drivability may be deteriorated.

JP-8-218924A shows that two filters filter the rotation speed signal in different frequencies. At least two stable operation values, and target stable operation values which inherently depend on the frequencies, and a control deviation of a natural frequency are detected. Specifically, a band-pass filter (BPF) of which center frequency is a camshaft frequency, a crankshaft frequency, and one-half of ignition frequency is used. The rotation speed signal is inputted into the band-pass filter. Based on the filter output, the control deviations are totalized and the engine output is controlled based on the totalized value. When the dispersion in the crankshaft speed is arisen between cylinders, this dispersion is calculated as a control deviation to determine whether the crankshaft speed tends to be high or low in relative view of every cylinder. The fuel injection amount is adjusted to reduce the dispersion in crankshaft speed between cylinders. However, the absolute deviation relative to the ideal value cannot be obtained. Hence, the combustion condition in each cylinder is not appropriately controlled. For example, when the crankshaft speed with respect to every cylinder deviates from the ideal speed in the same direction, the appropriate control is hardly performed.

SUMMARY OF THE INVENTION

The present invention is made in view of the foregoing matter and it is an object of the present invention to provide a fuel injection controlling apparatus capable of correcting a dispersion of the rotation speed of crankshaft between cylinders in all driving region of the internal combustion engine.

A fuel injection controlling apparatus for a multicylinder internal combustion engine includes a calculator calculating a rotation speed of a crankshaft of the engine, a filter filtering the rotation speed by a frequency which is defined based on a combustion frequency of the engine in order to obtain a value corresponding to a current torque, and a controller controlling a characteristic of each cylinder of the engine based on the value corresponding to the current torque.

BRIEF DESCRIPTION OF THE DRAWINGS

The above and other objects, features, and advantages of the present invention will become more apparent from the following detailed description made with reference to the accompanying drawings, in which like parts are designated by like reference number and in which.

DETAILED DESCRIPTION OF THE PREFERRED EMBODIMENTS

Embodiments of the present invention will be described hereinafter with reference to the drawings.

First Embodiment

Figure 1:
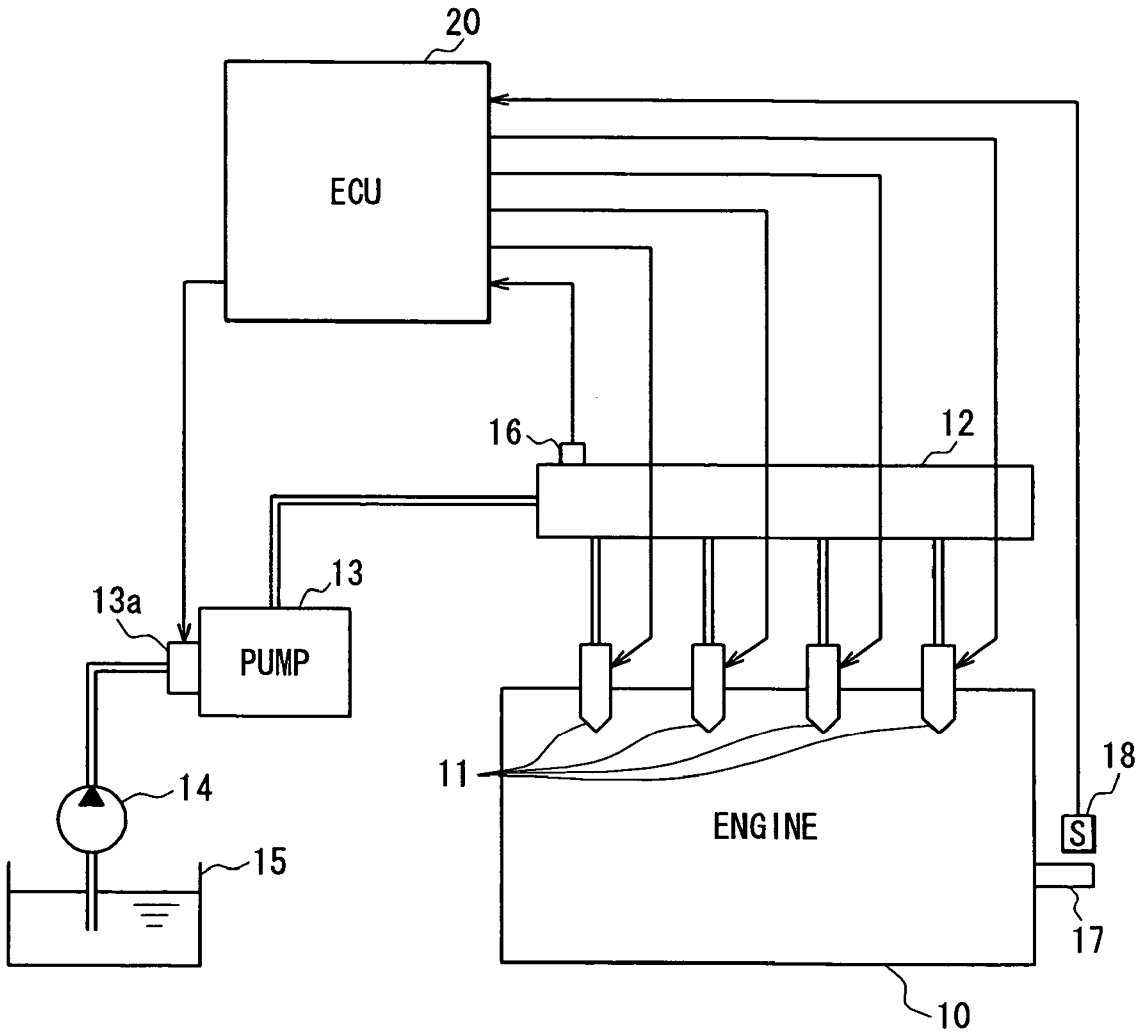
FIG. 1 is a schematic view showing an engine control system.

FIG. 1 is a schematic view of a common rail fuel injection system. A multi-cylinder diesel engine 10 is provided with an electromagnetic fuel injector 11 for each cylinder, which communicates with a common rail 12. A high-pressure pump 13 supplies high-pressure fuel to the common rail 12. The common rail 12 accumulates high-pressure fuel of which pressure corresponds to injection pressure. The engine 10 drives the high-pressure pump 13. The high-pressure pump 13 is provided with a suction control valve 13*a*. A feed pump 14 pumps up fuel in a fuel tank 15. The suction control valve **13*a* is electromagnetically driven to adjust an amount of the fuel that is supplied to the high-pressure pump 13**.

The common rail 12 is provided with a common rail pressure sensor 16 which detects fuel pressure in the common rail 12. The common rail 12 is also provided with a relief valve (not shown) which relieves an excess pressure in the common rail 12.

A speed sensor 18 is provided at a vicinity of a crankshaft 17 of the engine 10 in order to detect a rotation speed of the crankshaft 17. The speed sensosr 18 is, for example, an electromagnetic pick-up senor which generates pulse signals (NE pulse) representative of the rotation speed of the crank shaft 17. In this embodiment, an angle interval of the NE pulse is 30° CA so that the rotation speed can be detected every 30° CA.

An ECU 20 includes a microcomputer which is comprised of CPU, ROM, RAM, EEPROM. The ECU 20 receives signals detected by the common rail pressure sensor 16 and the speed sensor 18 and other signals representative of an accelerator position and a vehicle speed. The ECU 20 determines a fuel injection quantity and fuel injection timing, and outputs a control signal to the injector 11.

Figure 2A:
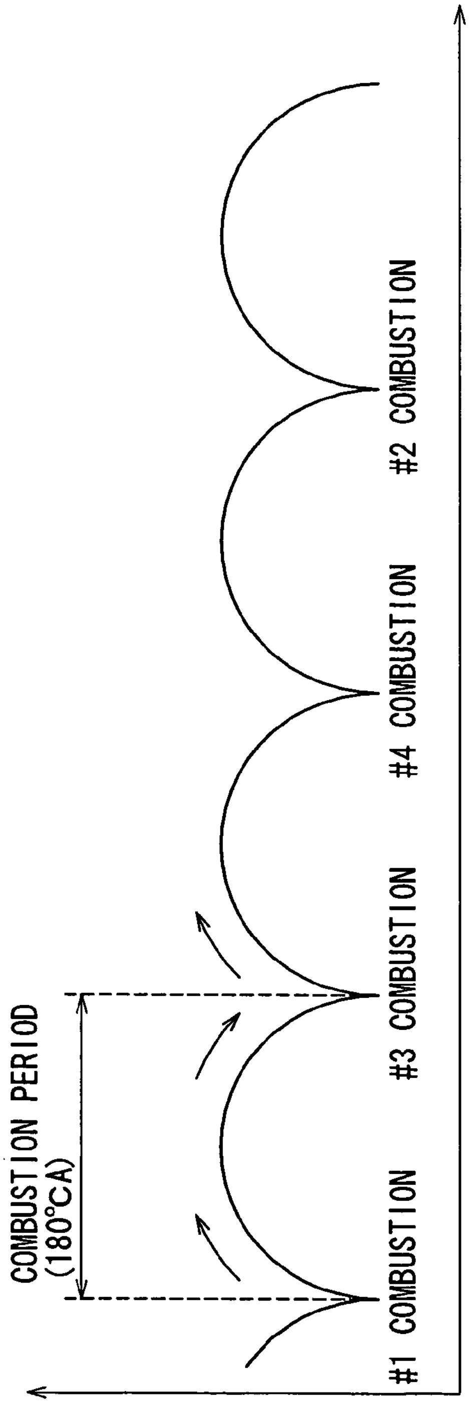
FIGS. 2A and 2B are time charts showing a transition of a rotation speed of each cylinder.

FIG. 2A is a graph showing a crankshaft rotation speed behavior in detail. In a case of a four-cylinder engine, the combustion is conducted in a first cylinder (#1), a third cylinder (#3), a fourth cylinder (#4), and a second cylinder (#2) in this order. The fuel injection is performed every 180° CA. An increase and a decrease in the rotation speed are repeated in each stroke. The combustion in the cylinder increases the rotation speed, and then a load applied to the crankshaft decreases the rotation speed. A workload can be estimated with respect to each cylinder based on the rotation speed behavior.

Figure 2B:
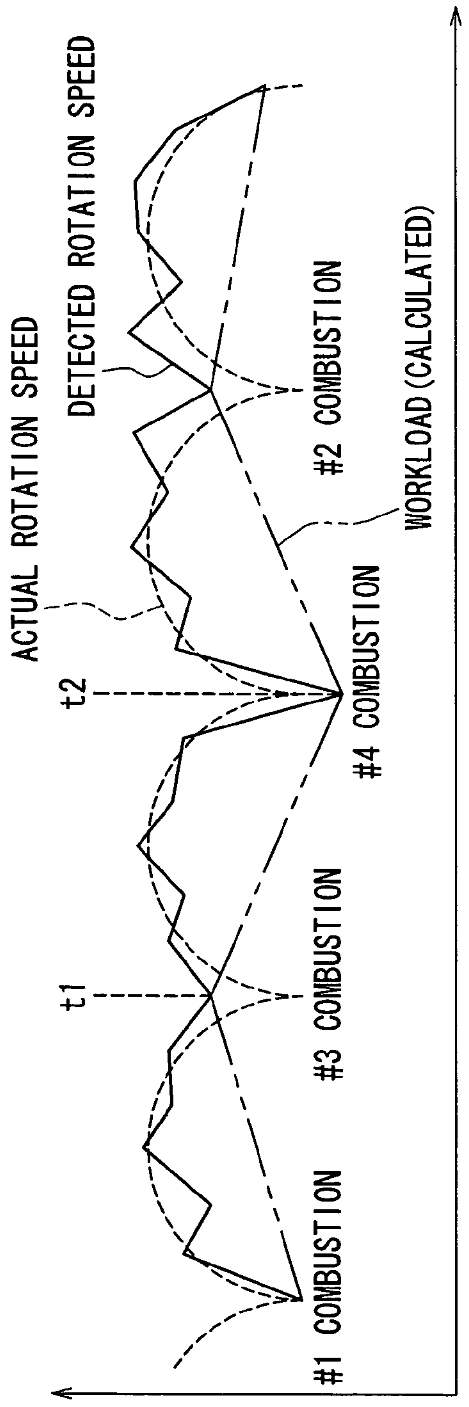

The workload of the subject cylinder can be calculated based on the rotation speed at the time when the combustion period of the cylinder is terminated. As shown in FIG. 2B, the workload of the first cylinder is calculated at a time of t1 in which the combustion period terminates. The workload of the third cylinder is calculated at a time of t2. However, the detected signals (NE pulse) indicative of the rotation speed include noise and detection errors. Hence, the detected rotation speed indicated by a solid line deviates from the actual rotation speed indicated by a dashed line. The accurate workload cannot be calculated at the time of t1 and t2.

In this embodiment, the rotation speed Ne is inputted into a filer M1 to calculate a value corresponding to a current torque. This value corresponding to current torque is referred to as a current torque correspondent Neflt hereinafter. The filter M1 calculates the current torque correspondent Neflt by extracting components of the rotation speed variation. The rotation speed Ne is detected in the output period of the NE pulse (30° CA). The filter M1 is comprised of a band-pass filter (BPF) to eliminate high-frequency components and low-frequency components. The current torque correspondent Neflt is expressed by a following equation (1).

$$Neflt(i)=k1*Ne(i)+k2*Ne(i-2)+k3*Neflt(i-1)+k4*Neflt(i-2) \tag{1}$$

wherein Ne(i) represents a present sampling value of the rotation speed, Ne(i−2) represent a sampling value of rotation speed at a time before previous time, Neflt(i−1) is a previous current torque correspondence, Neflt(i−2) is a current torque correspondence at a time before previous time, and k1 to k4 are constants. Every when the rotation speed Ne is inputted into the filter M1, the current torque correspondence Neflt (i) is calculated.

The above equation (1) is a discrete equation of a transfer function G(s) expressed by the following equation (2).

$$G(s)=\frac{2\zeta\omega s}{s^2+2\zeta\omega s+\omega^2} \tag{2}$$

wherein ζ represents an attenuation coefficient, and ω is a response frequency.

In this embodiment, the response frequency ω is defined by a combustion frequency of the engine 10, and the constants k1-k4 are determined based on the response frequency ω. The combustion frequency is an angle frequency indicative of the number of combustion every unit angle. In a case of a four-cylinder engine, the combustion period (combustion angle period) is 180° CA, and the combustion frequency is an inverse of the combustion period.

Figure 3:
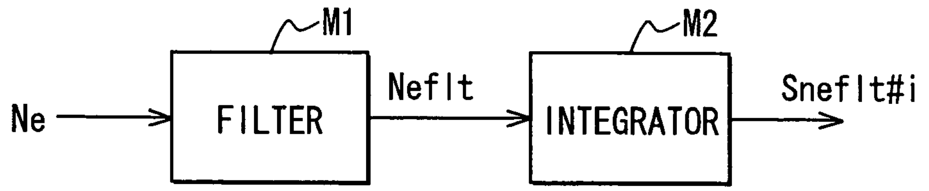
FIG. 3 is a block chart showing a control block for calculating a workload of each cylinder.

An integrating means M2 shown in FIG. 3 integrates the current torque correspondent Neflt in a constant range every combustion period of each cylinder in order to obtain cylinder workloads Sneflt #1-Sneflt #4 respectively. In this moment, the NE pulses outputted every 30° CA are numbered with NE pulse numbers 0-23. The NE pulse numbers 0-5 are given to the combustion period of the first cylinder, the NE pulse numbers 6-11 are given to the combustion period of the third cylinder, the NE pulse numbers 12-17 are given to the fourth cylinder, and the NE pulse numbers 18-23 are given to the second cylinder. The cylinder workloads Sneflt#1-Sneflt #4 of the first to the fourth cylinder are respectively calculated based on the following equation (3).

$$\begin{cases} Sneflt\#1=Neflt(0)+Neflt(1)+Neflt(2)+Neflt(3)+Neflt(4)+Neflt(5) \\ Sneflt\#3=Neflt(6)+Neflt(7)+Neflt(8)+Neflt(9)+Neflt(10)+Neflt(11) \\ Sneflt\#4=Neflt(12)+Neflt(13)+Neflt(14)+Neflt(15)+Neflt(16)+Neflt(17) \\ Sneflt\#2=Neflt(18)+Neflt(19)+Neflt(20)+Neflt(21)+Neflt(22)+Neflt(23) \end{cases} \tag{3}$$

The number of the cylinder will be expressed by #i, and the cylinder workloads Sneflt#1-Sneflt#4 are expressed by Sneflt#i, hereinafter.

Figure 4:
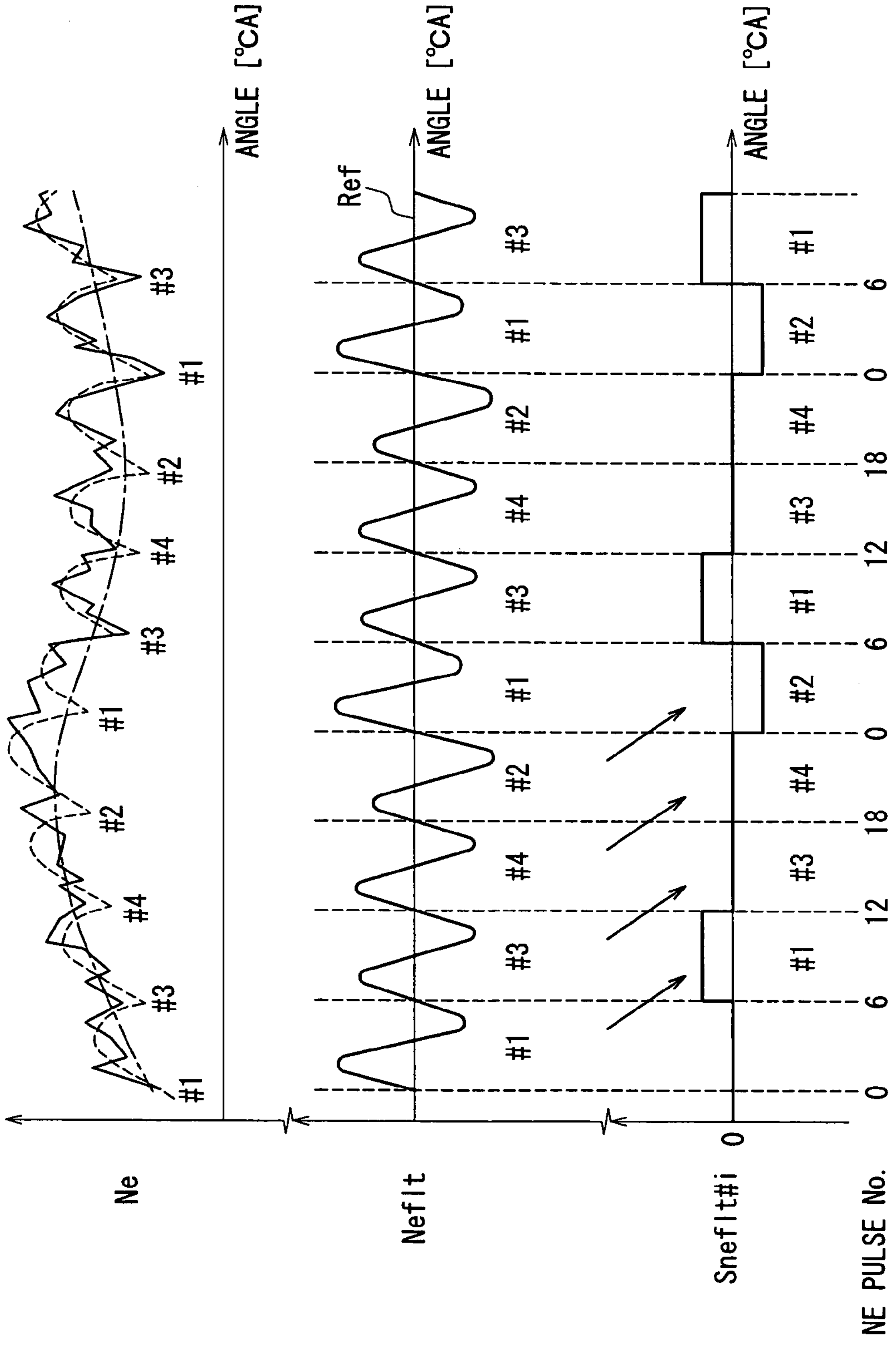
FIG. 4 is a time chart showing a rotation speed, a value corresponding to a current torque, and a workload of each cylinder.

FIG. 4 is a time chart showing the rotation speed Ne, the current torque correspondent Neflt, and the cylinder workloads Sneflt#i. The current torque correspondent Neflt periodically increases and decrease with respect to a reference revel Ref. The cylinder workload Sneflt#i is obtained by integrating the current torque correspondent Neflt in the combustion period of each cylinder. The integrated value of the positive current torque correspondent Neflt corresponds to the combustion torque, and the integrated value of the negative current torque correspondent Neflt corresponds to the load torque. The reference level Ref is determined based on the average rotation speed between cylinders.

Theoretically, the combustion torque and the load torque are equal to each other, so that the cylinder workload Sneflt#i becomes zero in the combustion period of each cylinder ("combustion torque"−"load torque"=0). However, practically, an injection characteristic and a friction characteristic of the injector 11 deteriorate with age between cylinders. Hence, the cylinder workload Sneflt#i has some variation. For example, in the first cylinder #1, the cylinder workload Sneflt#1 is larger than zero, and in the second cylinder #2, the cylinder workload Sneflt#2 is less than zero.

The cylinder workload Sneflt#i shows differences of workloads between cylinders with respect to the theoretical value.

Figure 5:
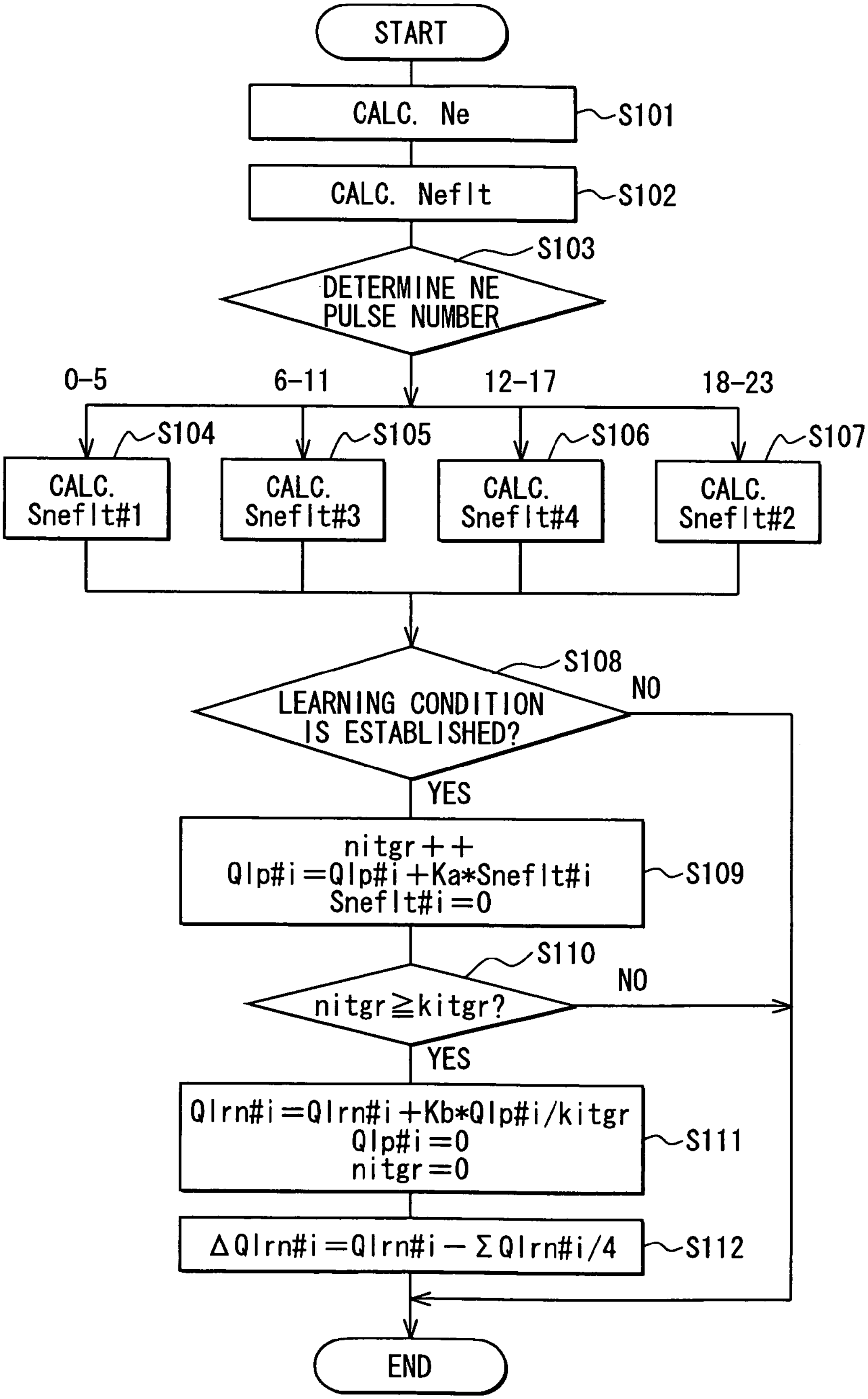
FIG. 5 is a flow chart showing a calculating process of a learning value of each cylinder.

A computation performed by the ECU 20 will be described hereinafter. FIG. 5 is a flowchart showing a calculating process of the learning value of each cylinder. This process is conducted by the ECU 20 when the NE pulse rises.

In step S101, a time interval of NE pulse is calculated based on the present NE pulse timing and the previous NE pulse timing in order to calculate a present rotation speed Ne (current rotation speed). In step S102, the current torque correspondent Neflt(i) is calculated based on the above equation (1).

In step S103, the present NE pulse number is determined. In steps S104-S107, the cylinder workload Snflt#i is calculated with respect to each cylinder #1-#4. That is, when the NE pulse number is 0-5, the cylinder workload Sneflt#1 of the first cylinder #1 is calculated in step 104. When the NE pulse number is 6-11, the cylinder workload Sneflt#3 of the third cylinder #3 is calculated in step S105. When the NE pulse number is 12-17, the cylinder workload Sneflt#4 of the fourth cylinder #4 is calculated in step S106. When the NE pulse number is 18-23, the cylinder workload Sneflt#2 of the second cylinder #2 is calculated in step S107.

In step S108, it is determined whether a learning condition of the cylinder workload is established. The learning condition is satisfied when the cylinder workloads of all cylinders have been calculated, a power transmission apparatus of a vehicle has been in a predetermined condition (a clutch is completely engaged), and an environmental condition has been predetermined situation (temperature of the engine coolant is higher than a predetermined temperature).

When the answer is NO in step S108, the procedure ends. When the answer is YES in step S108, the procedure proceeds to step S109. In step S109, the number of integration times nitgr is incremented by 1, and a workload learning value Qlp#i is calculated based on a following equation (4). The cylinder workload Sneflt#i is made zero.

$$Qlp\#i=Qlp\#i+Ka*Sneflt\#i \quad (4)$$

In step S110, it is determined whether the number of integration times nitgr has reached a predetermined number of times kitgr. When the number nitgr is lager than or equal to the number kitgr, the procedure proceeds to step S111. In step S111, the final learning value of workload Qlrn#i of each cylinder is calculated based on the following equation (5). The workload learning value Qlp#i is made zero, and the number of integration times nitgr is made zero.

$$Qlrn\#i=Qlrn\#i+Kb*Qlp\#i/kitgr \quad (5)$$

The workload learning value Qlp#i is averaged every integrating times to update the final learning value of workload Qlrn#i. By averaging the workload learning value Qlp#i, the error of the workload learning value Qlp#i can be canceled.

In step S112, a differential learning value ΔQlrn#i between cylinders is calculated based on the following equation (6).

$$\Delta Qlrn\#i=Qlrn\#i-\Sigma Qlrn\#i/4 \quad (6)$$

According to the equation (6), a dispersion of the final learning value of workload Qlrn#i is calculated with respect to the average (ΣQlrn#i/4) of the final learning value of workload Qlrn#i.

The final learning value of workload Qlrn#i and the differential learning value ΔQlrn#i are stored in a memory, such as an EEPROM or a stand-by RAM. Multiple driving regions are defined based on the fuel injection amount and the rotation speed as parameters. The values Qlrn#i and AQlrn#i are stored every driving regions.

Figure 6:
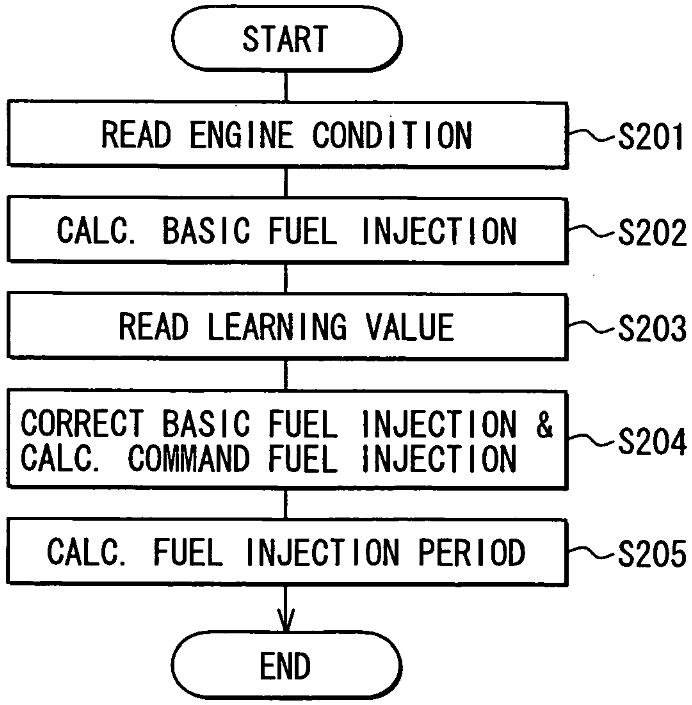
FIG. 6 is a flow chart showing a fuel injection control process.

Referring to FIG. 6, a fuel injection control is described hereinafter. In step S201, parameters indicative of the engine driving condition, such as rotation speed (an average rotation speed) or an accelerator position, are read. In step S202, a basic fuel injection amount is calculated based on the engine driving condition. The basic fuel injection amount may be corrected on the basis of the temperature of the engine coolant and a common rail pressure.

In step S203, the learning value (the final learning value of workload Qlrn#i, or the differential learning value ΔQlrn#i) is read with respect to the subject cylinder. In step S204, a command fuel injection amount (target fuel injection amount) is calculated by correcting the basic fuel injection amount.

The fuel injection amount can be corrected by canceling an absolute characteristics error in each cylinder. A deviation between the target workload and the final learning value of workload Qlrn#i is calculated. The correction amount of the fuel injection amount is calculated based on the deviation to correct the basic fuel injection amount. Alternatively, the fuel injection amount can be corrected by canceling the dispersion of characteristics between cylinders. The correction amount of fuel injection is calculated based on the differential learning value ΔQlrn#i with respect to every cylinders. The basic fuel injection amount is corrected based on the correction amount.

In step S205, a fuel injection period is calculated based on the rotation speed and the command fuel injection amount. The fuel is injected into a combustion chamber (not shown) through the injector 11 during the fuel injection period.

Based on the current torque correspondent Neflt with respect to each NE pulse, a fuel injection start timing, an ignition timing, a fuel injection terminating timing, and deviations (dispersions) of each timing can be estimated.

Figure 7:
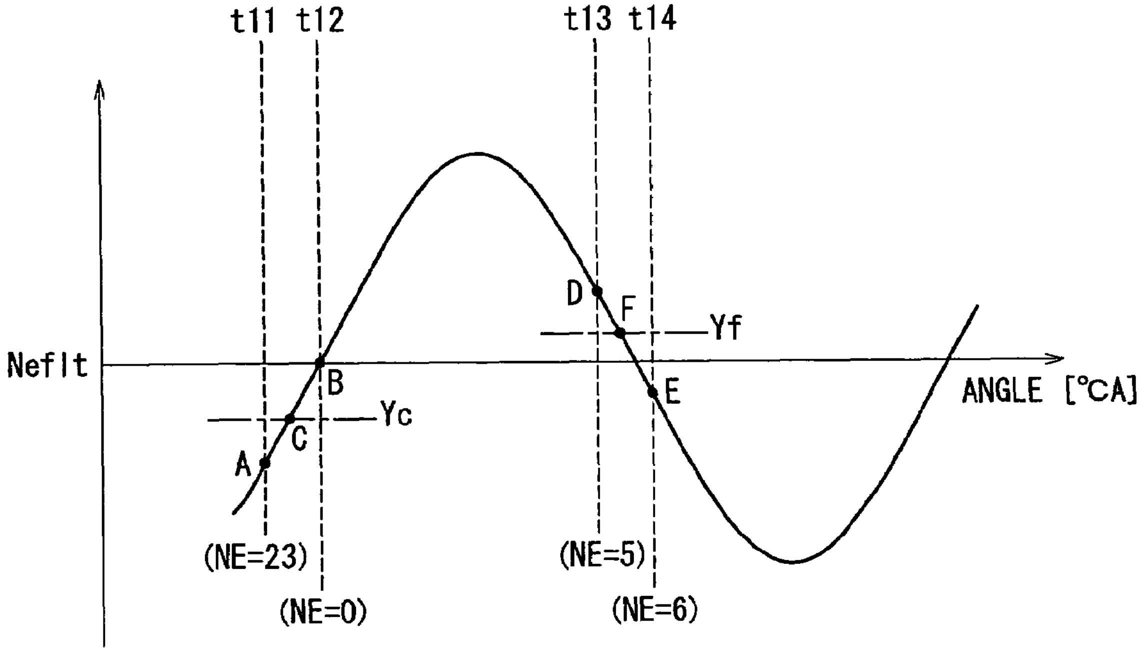
FIG. 7 is a time chart showing a transition of a value corresponding to a current torque with a combustion in a specific cylinder.

FIG. 7 is a time chart showing the current torque correspondent of a specific cylinder. In FIG. 7, t11, t12, t13, and t14 represent output timings of NE pulse. The current torque correspondent Neflt is calculated in these timings. At the time of t11 and t12, the rotation speed increases. With respect to the first cylinder #1, the time of t11 is the output timing of No. 23 pulse, and the time of t12 is the output timing of No. 0 pulse. At the time of t13 and t14, the rotation speed decreases. With respect to the first cylinder #1, the time of t13 is the output timing of No. 5 pulse, and the timing of t14 is the output timing of No. 6 pulse.

In the case that the current torque correspondent Neflt increases with an increment of the rotation speed, at the time of t11 (a point "A"), a time instant is denoted by Ta and the current torque correspondent Neflt is denoted by Ya. At the time of t12 (a point "B"), a time instance is denoted by Tb and the current torque correspondent Neflt is denoted by Yb. A threshold of the current torque correspondent Neflt for determining a fuel injection start timing or the ignition timing is denoted by Yc. The time instance Tc at which the current torque correspondent Neflt becomes Yc at a point "C" is expressed by a following equation (7).

$$Tc=(Tb-Ta)*(Yc-Ya)/(Yb-Ya)+Ta \quad (7)$$

A reference time instance Tc0 is predetermined. The time instance Tc is compared with the reference time instance Tc0 to calculate the deviation time ΔTc of fuel injection starting timing and the ignition timing.

$$\Delta Tc=K1*(Tc-Tc0) \quad (8)$$

In order to calculate the difference of fuel injection starting timing or the ignition timing between respective cylinders, the calculated fuel injection starting timing or the calculated ignition timing are compared with each other between respective cylinders. This difference between respective cylinders can be derived by calculating the average and obtaining a difference between the average and calculated value.

In the case that the current torque correspondent Neflt decreases with an decrease of the rotation speed, at the time of t13 (a point "D"), a time instant is denoted by Td and the current torque correspondent Neflt is denoted by Yd. At the time of t14 (a point "E"), a time instance is denoted by Te and the current torque correspondent Neflt is denoted by Ye. A threshold of the current torque correspondent Neflt for determining a fuel injection stop timing is denoted by Yf. The time instance Tf at which the current torque correspondent Neflt becomes Yf at a point "F" is expressed by a following equation (9).

$$Tf=(Te-Td)*(Yf-Yd)/(Ye-Yd)+Td \quad (9)$$

A reference time instance Tf0 is predetermined. The time instance Tf is compared with the reference time instance Tf0 to calculate the deviation time ΔTc of fuel injection stop timing.

$$\Delta Tf=K2*(Tf-Tf0) \quad (10)$$

In order to calculate the difference of fuel injection stop timing between respective cylinders, the calculated fuel injection stop timings are compared with each other between respective cylinders. This difference between respective cylinders can be derived by calculating the average and obtaining a difference between the average and calculated value.

Figure 8:
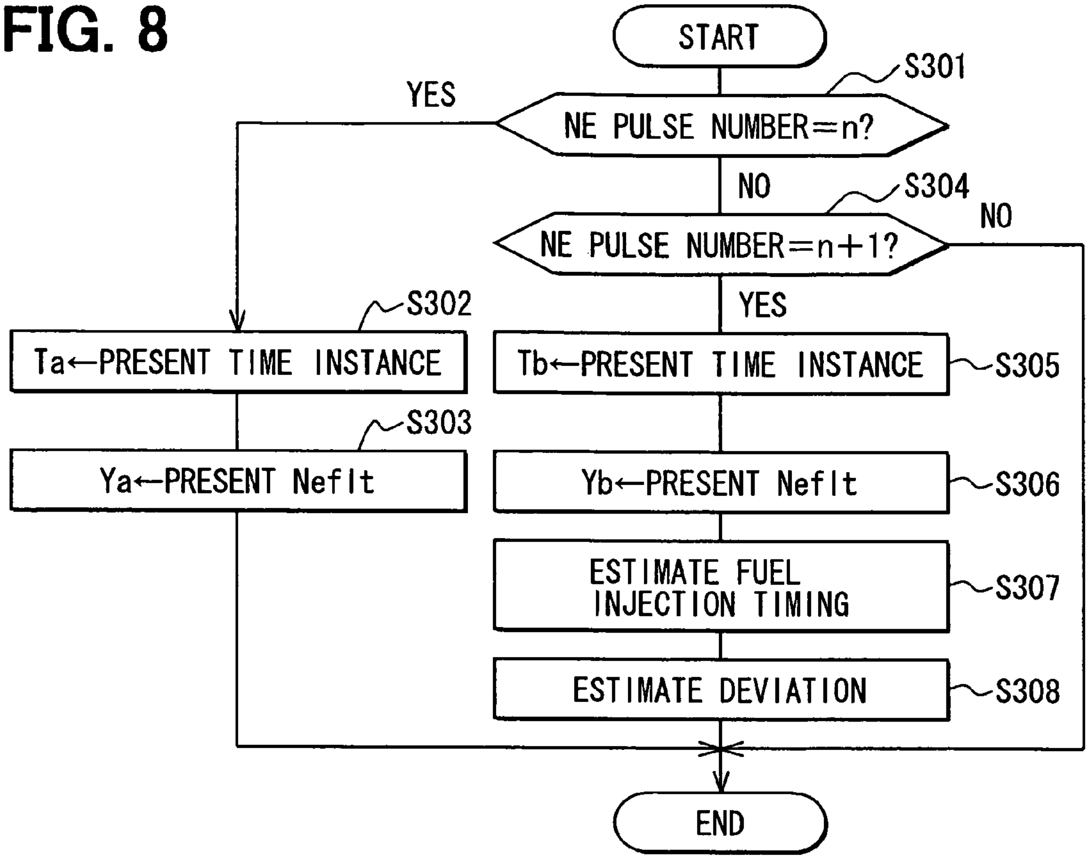
FIG. 8 is a flowchart showing a fuel injection start timing estimating process.

FIG. 8 is a flowchart showing a fuel injection start timing estimating process. In step S301, it is determined whether NE pulse number is a predetermined pulse number "n". For example, in the first cylinder #1, "n" is 23. When the NE pulse number is "n", the present time instance is stored as Ta in step S302. In step S303, the present current torque correspondent Neflt is stored as Ya.

In step S304, it is determined whether the NE pulse number is "n+1". For example, in the first cylinder #1, "n" is 0. When the NE pulse number is "n+1", the present time instance is stored as Tb in step S305. In step S306, the present current torque correspondent Neflt is stored as Yb.

In step S307, the time instance Tc in which the current torque correspondent Neflt is the threshold Yc is calculated to estimate the fuel injection starting timing. In step S308, a deviation of the fuel injection starting timing is estimated based on the above equation (8).

After the fuel injection starting timing and the deviation between respective cylinders are estimated, the command fuel injection period is corrected based on the estimated value.

The ignition timing and the fuel injection stop timing are calculated according to the process shown in FIG. 8 by use of the equations (7)-(10).

According to the present embodiment, following effects can be achieved.

Since the rotation speed Ne is filtered by the combustion frequency of the engine 10 every timing to calculate the current torque correspondent Neflt, the current torque correspondent Neflt can be obtained appropriately based on the fuel injection condition and the combustion condition. Furthermore, the current torque correspondent Neflt is integrated within the specific range with respect to each cylinder so that the cylinder workload Sneflt#i is calculated. The fuel injection amount is adjusted cylinder-by-cylinder based on the cylinder workload Sneflt#i of each cylinder (actually, the final learning value of workload Qlrn#i, or the differential learning value ΔQlrn#i), so that the characteristics of each cylinder can be desirably controlled. Hence, the emission is restricted and the drivability is enhanced.

The absolute dispersion of characteristics of each cylinder can be detected as well as the relative dispersion between cylinders, so that various controls can be performed cylinder by cylinder.

Since the band-pass filter (BPF) is utilized as a filtering means, the varying components of low frequency due to acceleration or deceleration and the varying components of high frequency of noise can be eliminated from the rotation speed signal in order to extract only torque varying components. Thereby, the current torque correspondent Neflt can be accurately calculated to reduce the dispersion of characteristics between cylinders.

Since the final learning value of workload Qlrn#i, or the differential learning value ΔQlrn#i is stored in the backup memory, the dispersion of characteristics due to aging and/or individual difference can be considered.

Since the fuel injection timing, the ignition timing, and the fuel injection stop timing can be estimated based on the current torque correspondent Neflt, the dispersion of fuel injection timing, the ignition timing, and the fuel injection stop timing can be restricted.

The present invention is not limited to the above embodiment. Modifications will be described hereinafter.

In the first embodiment, the command fuel injection amount is calculated by correcting the fuel injection amount based on the learning values. Alternatively, the command furl injection period can be corrected based on the learning values.

In the first embodiment, the cylinder workload Sneflt#i is calculated by integrating the current torque correspondent Neflt in a combustion period. Alternatively, the workload due to the combustion and the workload due to the load can be respectively calculated. Specifically, the current torque correspondent Neflt is integrated in a specific range in which the rotation speed increases in order to obtain the workload due to the combustion. The current torque correspondent Neflt is integrated in a specific range in which the rotation speed decreases in order to obtain the workload due to the load. The fuel injection amount is controlled based on each workload.

Figures 10A, 10B, 10C, 10D, 10E:
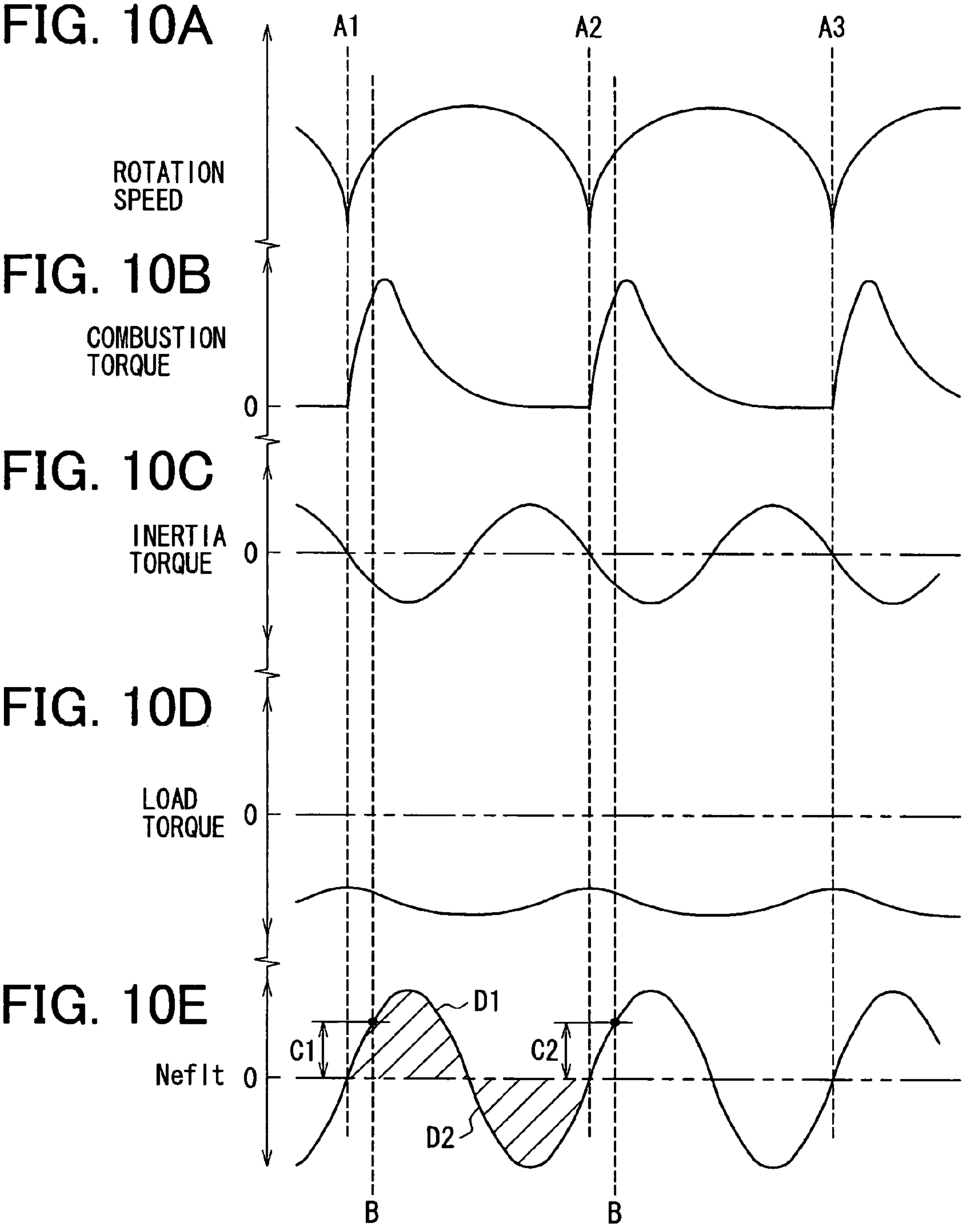
FIGS. 10A-10E are time charts showing a rotation speed, a combustion torque, an inertia torque, a load torque, and a value corresponding to a current torque.

The current torque correspondent Neflt varies according to the stroke of the piston and a rotational angle position of the crankshaft. This variation depends on the combustion torque, an inertia torque, and the load torque. FIG. 10A-10E respectively show the rotation speed, the combustion torque, the inertia torque, the load torque, and the current torque correspondent. In FIG. 10E, an area denoted by "D1" corresponds to the workload due to the combustion, and an area denoted by "D2" corresponds to the workload due to the load.

The cylinder workload Sneflt#i is calculated at the time when combustion is occurred and at the time when the combustion is not occurred. A difference between these cylinder workloads is calculated to obtain the workload due to combustion. When the combustion is not occurred, the fuel injection is not conducted, so that the cylinder workload Sneflt#i does not includes the workload corresponding to the combustion torque.

During the combustion period, the current torque correspondent Neflt is a sum of the combustion torque, the inertia torque, and the load torque. During the non-combustion period, the current torque correspondent Neflt is a sum of the inertia torque and the load torque. That is, the current torque correspondent is different between the combustion period and the non-combustion period.

Figure 9:
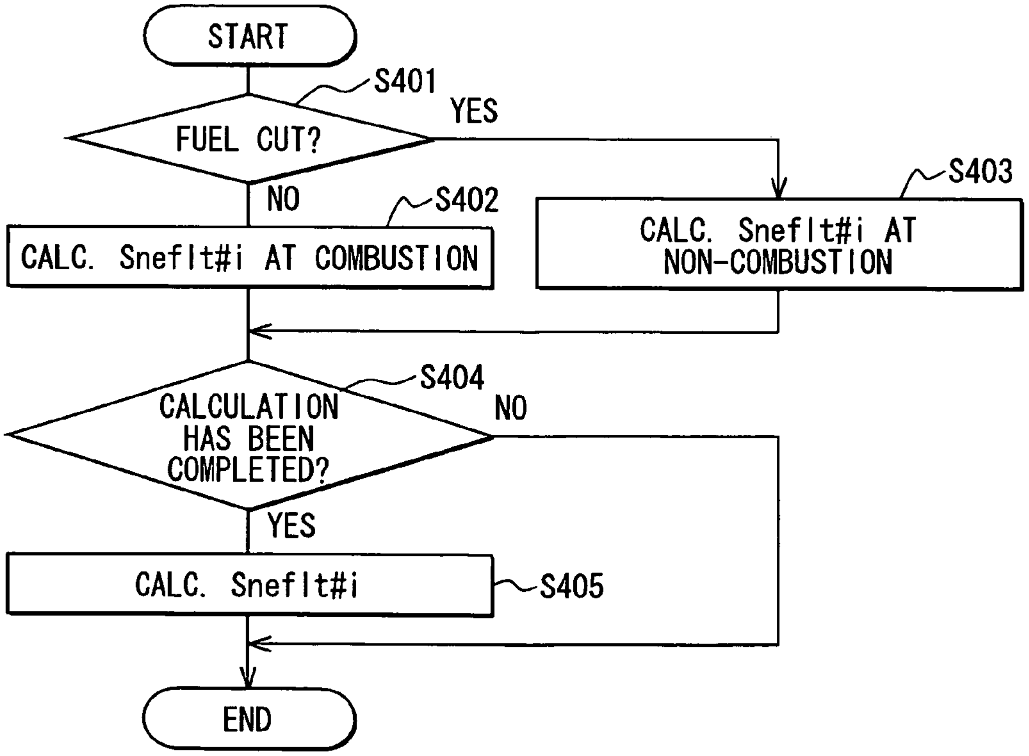
FIG. 9 is a flowchart showing a calculation process of the combustion workload of each cylinder.

Specifically, based on a flowchart shown in FIG. 9, the calculation process of the combustion workload is performed.

In step S401, it is determined whether it is a fuel-cut period. When the answer is NO, the procedure proceeds to step S402 in which the cylinder workload Sneflt#i at the time of combustion is calculated. When the answer is YES, the procedure proceeds to step S403 in which the cylinder workload Sneflt#i at the time of non-combustion is calculated. In step 404, it is determined whether the cylinder workload Sneflt#i has been calculated at both situations. When the answer is YES, the procedure proceeds to step S405 in which the cylinder workload Sneflt#i is calculated by subtracting the cylinder workload at the fuel-cut period from the cylinder workload at the combustion period.

Alternatively, at a predetermined angle position, the combustion torque of each cylinder can be calculated based on a difference between the current torque correspondent Neflt which is obtained during combustion period and the current torque correspondent Neflt which is obtained during non-combustion period. The differential combustion torque between cylinders can be calculated by comparing the combustion torque of each cylinder.

In FIGS. 10A-10E, the rotation speed Ne starts to increase at the time of "A1", "A2", and "A3" in a cylinder. An angle between "A1" and "A2" and an angle between "A2" and "A3" correspond to combustion angle periods. As shown in FIG. 10B, the combustion torque starts to increase at a time of stating of combustion, and starts to decrease at a time of terminating of combustion. The inertia torque varies according to a rotational inertia torque of a flywheel (not shown). As shown in FIG. 10C, when the rotation speed increases, the inertia torque generally becomes negative values, and when the rotation speed decreases, the inertial torque generally becomes positive values. As shown in FIG. 10D, the load torque is always negative value and varies in a small range. The sum of the combustion torque, the inertia torque, and the load torque corresponds to the current torque correspondent.

However, due to the difference in characteristics between cylinders, the waveform of the current torque correspondent Neflt varies. In the same rotational angel position, each cylinder has different current torque correspondent Neflt. As shown in FIG. 10E, at the same rotational position "B" of each cylinder, the current torque correspondent Neflt (C1, C2) corresponds to the characteristics of each cylinder. Peak values and bottom values of the current torque correspondent Neflt are different between cylinders.

The current torque correspondent Neflt is calculated at the same rotational angle position with respect to each cylinder, and then the characteristics of each cylinder can be estimated based on the current torque correspondent. Alternatively, the difference in characteristics between the cylinders can be estimated by comparing the current torque correspondent Neflt between the cylinders. In a structure that the NE pulse has the pulse number, the current torque correspondent Neflt can be calculated with respect to the NE pulse having the same pulse number. Multiple rotational angle positions are provided to calculate the current torque correspondent Neflt. These multiple angle positions are substantially equal to each other.

Alternatively, the peak value or the bottom value of the current torque correspondent Neflt is obtained to estimate the characteristics of each cylinder. The difference in characteristics between cylinders can be estimated by comparing at least one of the peak value and the bottom value between cylinders. The characteristics of each cylinder can be evaluated based on the peak value of the current torque correspondent, the bottom value of the current torque correspondent, or the difference between the peak value and the bottom value.

A low-pass filter (LPF) or a high-pass-filter (HPF) can be used instead of the band-pass filter (BPF). The combustion frequency is a response frequency co of the transfer function which defines the LPH or the HPF, whereby the current torque correspondent can be calculated.

A resolver can be used to detect the rotational position of the crankshaft linearly. The current torque correspondent Neflt can be calculated at arbitrary timing. The current torque correspondent Neflt is continuously calculated to estimate the fuel injection start timing, the ignition timing, or fuel injection stop timing. When the current torque correspondent Neflt reaches a predetermined threshold, the time instance is measured. The fuel injection start timing, the ignition timing, or the fuel injection stop timing can be directly estimated from the measured time instance.

Second Embodiment

Figure 11:
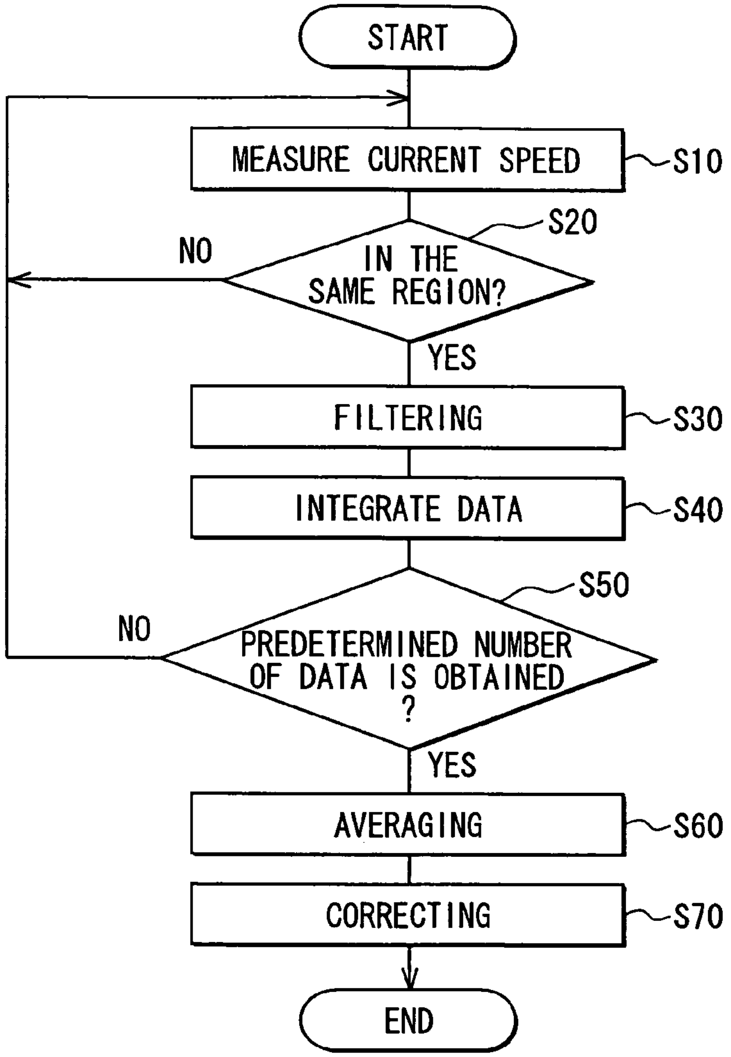
FIG. 11 is a flowchart showing a process for correcting a dispersion in fuel injection amount between cylinders.
Figure 12:
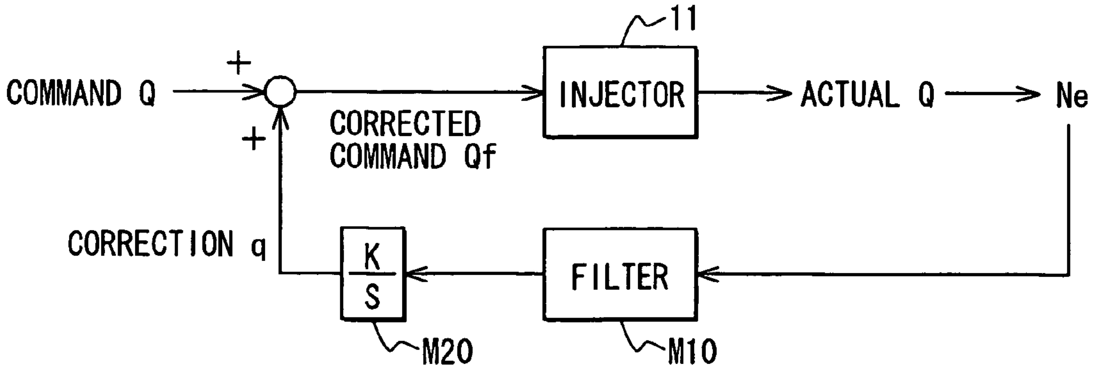
FIG. 12 is a block chart showing a control block for correcting a dispersion between cylinders.
Figure 13:
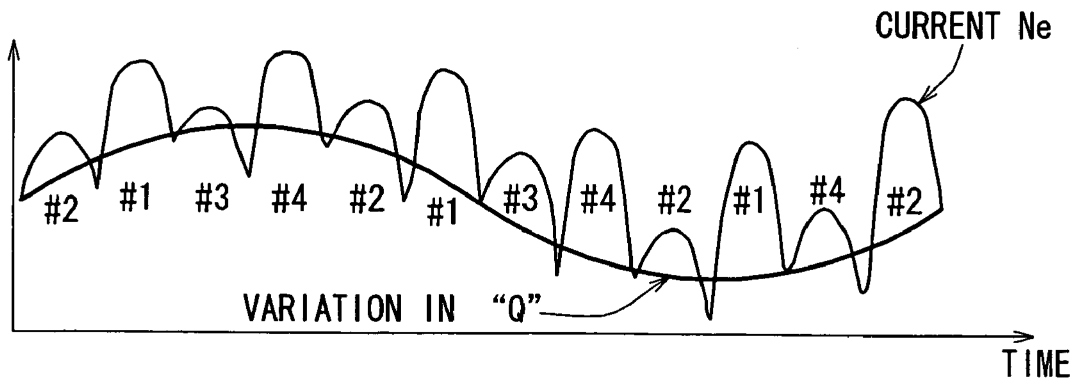
FIG. 13 is a chart showing a waveform of a current rotation speed of each cylinder.
Figure 16:
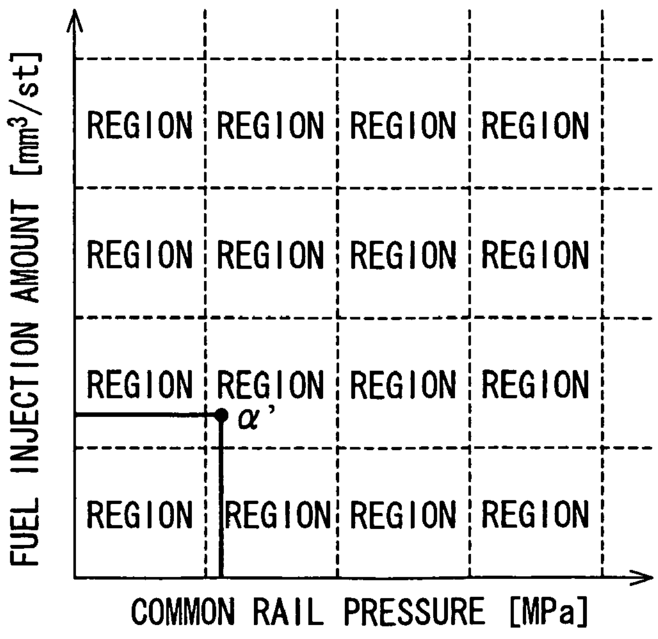
FIG. 16 is a data map having coordinate axes of a common rail pressure and a fuel injection amount.

Referring to FIGS. 11 and 12, a second embodiment will be described hereinafter. FIG. 11 is a flowchart showing a process for correcting a dispersion in fuel injection amount between cylinders. In step S10. a current rotation speed shown in FIG. 13 is measured. Specifically, the current rotation speed is derived from a pulse interval between a first rotational angle (ATDC 42°) and a second rotational angel (ATDC 72°). In step S20, it is determined whether the present value and the previous value are in the same region. For example, as shown in FIG. 6, it is determined whether the present measured data (the current rotation speed) and the previous measured data are in the same region with respect to multiple regions which are defined in data map "A" having coordinate axes of the rotation speed and the fuel injection amount. When the answer is YES in step S20, the procedure proceeds to step S30. When the answer is NO in step S20, the procedure goes back to step S10. Instead of data map "A", a data map "B" having coordinate axes of the common rail pressure and the fuel injection amount. The data map "B" is shown in FIG. 16.

The measured data in step S10 is inputted into a low-pass filter M10 shown in FIG. 12 to extract low-frequency components. In step S40, the extracted data is stored in the corresponding region defined by the data map "A" or data map "B". The stored data of each cylinder is integrated respectively. In this embodiment, since the diesel engine has four cylinders, four integrated data are generated by low-pass filter M10.

In step S50, it is determined whether the number of data stored in the specific region has reached a predetermined number. When the answer is YES in step S50, the procedure proceeds to step S60. When the answer is No, the procedure goes back to step S10.

Figure 14:
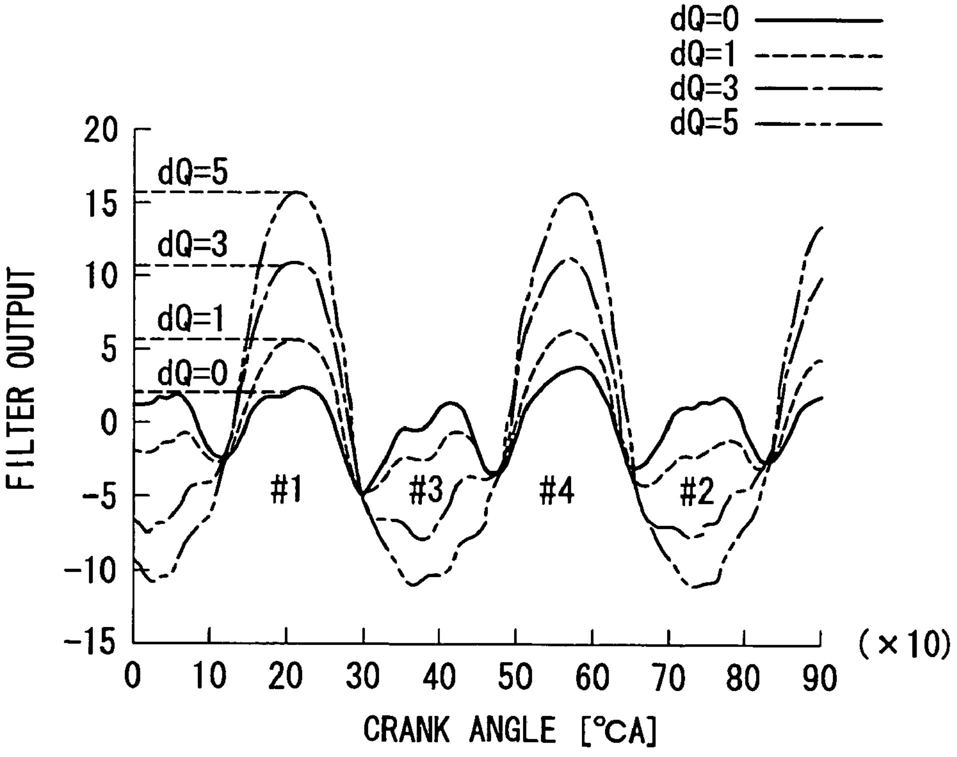
FIG. 14 is a graph showing a dispersion in fuel injection amount between cylinders.
Figure 15:
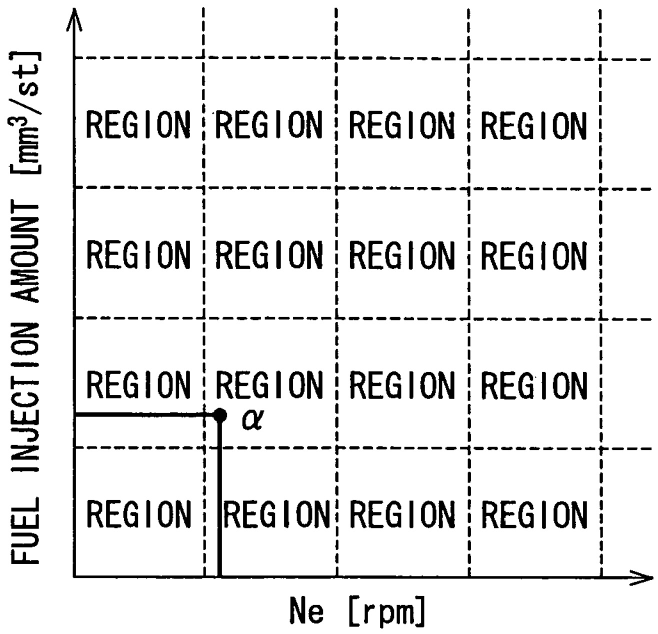
FIG. 15 is a data map having coordinate axes of an engine rotation speed and a fuel injection amount.

In step S60, the data is averaged by an averaging means M20 shown in FIG. 12, whereby the dispersion in fuel injection amount cylinders is extracted as shown in FIG. 14. FIG. 14 shows dispersion in fuel injection amount due to the individual difference between injectors. The magnitude of the dispersion dQ in the fuel injection amount is expressed by a numeral "0" to "5". The dispersion of the speed between cylinders #1 to #4 is illustrated in FIG. 14. With respect to cylinders #1, and #4, the dispersion dQ in fuel injection amount is the positive value. With respect to cylinders #3, and #2, the dispersion dQ is the negative value. FIG. 14 shows the averaged value of the filter output with respect to the crank angel. In the case where the dispersion dQ=2, the filter output is added by the amount of 2 $mm^3$/stroke relative to the averaged amount with respect to the cylinders #1, and #4 in order to average the filtered output. The filter output is subtracted by the amount of 2 $mm^3$/stroke relative to the averaged amount with respect to the cylinders #3, and #2 in order to average the filtered output.

In this process, the data is obtained between the first rotational angel (ATDC 42°) and the second rotational angel (ATDC 72°). Hence, the averaged process value of the filter output between the first rotational angel and the second rotational angel shown in FIG. 14 is obtained in step S60.

In FIG. 14, according as the dispersion dQ increases, the dispersion in rotation speed between the cylinders increases.

The averaging process in step S60 is described in detail hereinafter.

The integrated data obtained in step S40 is divided by the predetermined value to calculate the average of the integrated data with respect to each cylinder. Four averages are obtained. These four averages are integrated and divided by the number of cylinder (four, in this embodiment) to calculate the whole average. The deviation of each cylinder is calculated by subtracting the individual average of each cylinder from the whole average of every cylinder. This deviation is converted into a value to the fuel injection amount to calculate the fuel injection correction amount "q".

In step S70, the fuel injection amount is corrected in such a manner as to reduce the dispersion in fuel injection amount between the cylinders. Specifically, as shown in FIG. 3, the corrected command fuel injection amount Qf is calculated by adding the correction amount "q" on the command fuel injection amount Q. The fuel injector 11 is controlled based on the corrected command fuel injection amount Qf.

According to the second embodiment, the current rotation speed of each cylinder is filtered by low-pass filter M10 to obtain the low-frequency components, so that the high-frequency noise is eliminated to accurately detect the rotational variation between cylinders. Then, the predetermined piece of data is integrated and is averaged, so that only the dispersion of the fuel injection between the cylinders can be detected. As the result, the fuel injection amount is corrected in such a manner as to reduce the dispersion between cylinders, so that the dispersion in the rotation speed between cylinders can be restricted.

The above-described control can be applied to whole driving rage of engine. The dispersion of the rotation speed between cylinders can be corrected even when the engine is running in a normal speed as well as idling speed in order to reduce the emission and enhance the drivability.

The data filtered by the low-pass filter M10 is stored in the data map "A" or the data map "B", and the predetermined piece of data is integrated and averaged in every region. Thereby, the fuel injection correction amount can be derived every regions whish are defined in the data map "A" or "B". The fuel injection correction amount learned in the low-load and low-speed region is not used in the high-load and high-speed region, so that the appropriate correction can be performed in a whole driving range of the engine.

The present embodiment can be applied to a gasoline engine as well as the diesel engine.

What is claimed is:

1. A fuel injection controlling apparatus for a multicylinder internal combustion engine comprising:
- a calculator calculating a rotation speed of a crankshaft of the internal combustion engine;
- a filter filtering the rotation speed by a frequency which is defined based on a combustion frequency of the internal combustion engine in order to obtain a value corresponding to a current torque; and
- a controller controlling a characteristic of each cylinder of the internal combustion engine based on the value corresponding to the current torque.

2. A fuel injection controlling apparatus for a multicylinder internal combustion engine comprising:
- a speed detecting means for detecting a current rotation speed of each cylinder of the internal combustion engine;
- a low-pass filter passing no high-frequency component of the detected current rotation speed, the low-pass filter passing a low-frequency component of the detected current rotation speed;
- a dispersion detecting means for detecting a fuel injection amount dispersion after integrating and averaging data of each cylinder predetermined times, the data having passed through the low-pass filter; and
- a correction means for correcting a fuel injection amount in such a manner as to reduce the fuel injection amount dispersion between cylinders.

3. A fuel injection controlling apparatus for a multicylinder internal combustion engine comprising:
- a speed detecting means for detecting a current rotation speed of each cylinder of the internal combustion engine;
- a low-pass filter passing only a low-frequency component of the detected current rotation speed;
- a dispersion detecting means for detecting a fuel injection amount dispersion after integrating and averaging data of each cylinder at predetermined times, the data having passed through the low-pass filter; and
- a correction means for correcting a fuel injection amount in such a manner as to reduce the fuel injection amount dispersion between cylinders.

4. A fuel injection controlling apparatus according to claim 3, further comprising
- a data map having coordinate axes of the rotation speed of the engine and the fuel injection amount, wherein the data map is divided into a plurality of regions based on the rotation speed and the fuel injection amount, and the data passing through the low-pass filter is stored in a corresponding region.

5. A fuel injection controlling apparatus according to claim 3, further comprising
- a data map having coordinate axes of a fuel injection pressure and the fuel injection amount, wherein the data map is divided into a plurality of regions based on the fuel injection pressure and the fuel injection amount, and the data passing through the low-pass filter is stored in a corresponding region.

6. A fuel injection controlling apparatus for a multicylinder internal combustion engine comprising:

a calculation means for calculating a rotation speed of a crankshaft of the internal combustion engine;

a filtering means for filtering the rotation speed by a frequency which is defined based on a combustion frequency of the internal combustion engine in order to obtain a value corresponding to a current torque; and a controlling means for controlling a characteristic of each cylinder of the internal combustion engine based on the value corresponding to the current torque.

7. A fuel injection controlling apparatus according to claim 6, wherein the filtering means is defined by a transfer function of which response frequency is the combustion frequency.

8. A fuel injection controlling apparatus according to claim 6, wherein the filtering means is a band-pass filter.

9. A fuel injection controlling apparatus according to claim 6, wherein the value corresponding to the current torque is obtained every predetermined rotation angle with respect to each cylinder, and the characteristic of each cylinder is estimated based on the value corresponding to the current torque.

10. A fuel injection controlling apparatus according to claim 6, wherein the value corresponding to the current torque is obtained every predetermined rotation angle with respect to each cylinder, and a difference in characteristic of each cylinder is estimated by comparing the value corresponding to the current torque between cylinders.

11. A fuel injection controlling apparatus according to claim 6, wherein at least one of a peak value and a bottom value of the value corresponding to the current torque of each cylinder is obtained, and the characteristic of each cylinder is estimated based on the obtained value.

12. A fuel injection controlling apparatus according to claim 6, wherein at least one of a peak value and a bottom value of the value corresponding to the current torque of each cylinder is obtained, and a difference of characteristic between the cylinders is estimated by comparing the obtained value between the cylinders.

13. A fuel injection controlling apparatus according to claim 6, wherein a combustion torque is calculated based on a difference between the value corresponding to the current torque which is calculated at a combustion condition and the value corresponding to the current torque which is calculated at a non-combustion condition.

14. A fuel injection controlling apparatus according to claim 6, further comprising:

a means for calculating at least one of a respective workload and a total workload of a combustion, an inertia force, and a load by integrating the value corresponding to the current torque every cylinder in a predetermined range.

15. A fuel injection controlling apparatus according to claim 14, wherein the workload of each cylinder is calculated by integrating the value corresponding to the current torque in a predetermined range during a combustion period and a non-combustion period, and the workload of the combustion of each cylinder is calculated based on a difference between the workload during the combustion period and the workload during the non-combustion period.

16. A fuel injection controlling apparatus according to claim 14, wherein the respective workload, the total workload, or a difference thereof between cylinders is stored as a learning value.

17. A fuel injection controlling apparatus according to claim 6, further comprising:

a means for calculating at least one of differences in a respective workload and a total workload of a combustion, an inertia force, and a load between cylinders by integrating the value corresponding to the current torque every cylinder in a predetermined range and comparing integrated values between cylinders.

18. A fuel injection controlling apparatus according to claim 6, further comprising:

a means for calculating at least one of a respective workload and a total workload of a combustion, an inertia force, and a load, as a combustion condition parameter, by integrating the value corresponding to the current torque every cylinder in a predetermined range;

a means for calculating an average of the combustion condition parameters of every cylinder; and a means for calculating a difference between the average of the combustion condition parameters and the combustion condition parameter of each cylinder.

19. A fuel injection controlling apparatus according to claim 6, further comprising a means for estimating a fuel injection start timing or an ignition timing by comparing the value corresponding to the current torque with a predetermined threshold in a situation that the value corresponding to the current torque of each cylinder increases.

20. A fuel injection controlling apparatus according to claims 6, further comprising a means for estimating a fuel injection stop timing by comparing the value corresponding to the current torque with a predetermined threshold in a situation that the value corresponding to the current torque of each cylinder decreases.

21. A fuel injection controlling apparatus according to claim 6, further comprising a means for estimating a fuel injection start timing or an ignition timing by comparing the value corresponding to the current torque with a predetermined threshold in a situation that the value corresponding to the current torque of each cylinder increases, and for calculating a difference in fuel injection start timing or the ignition timing between each cylinder.

22. A fuel injection controlling apparatus according to claims 6, further comprising a means for estimating a fuel injection stop timing by comparing the value corresponding to the current torque with a predetermined threshold, and for calculating a difference in the fuel injection stop timing between the cylinders in a situation that the value corresponding to the current torque of each cylinder decreases.

23. A fuel injection controlling method for a multicylinder internal combustion engine comprising:

calculating a rotation speed of a crankshaft of the internal combustion engine;

filtering the rotation speed by a frequency which is defined based on a combustion frequency of the internal combustion engine in order to obtain a value corresponding to a current torque; and controlling a characteristic of each cylinder of the internal combustion engine based on the value corresponding to the current torque.

* * * * *